O. D. WOODRUFF.
Meat Cutter.
No. 26,806.
Patented Jan'y 10, 1860.
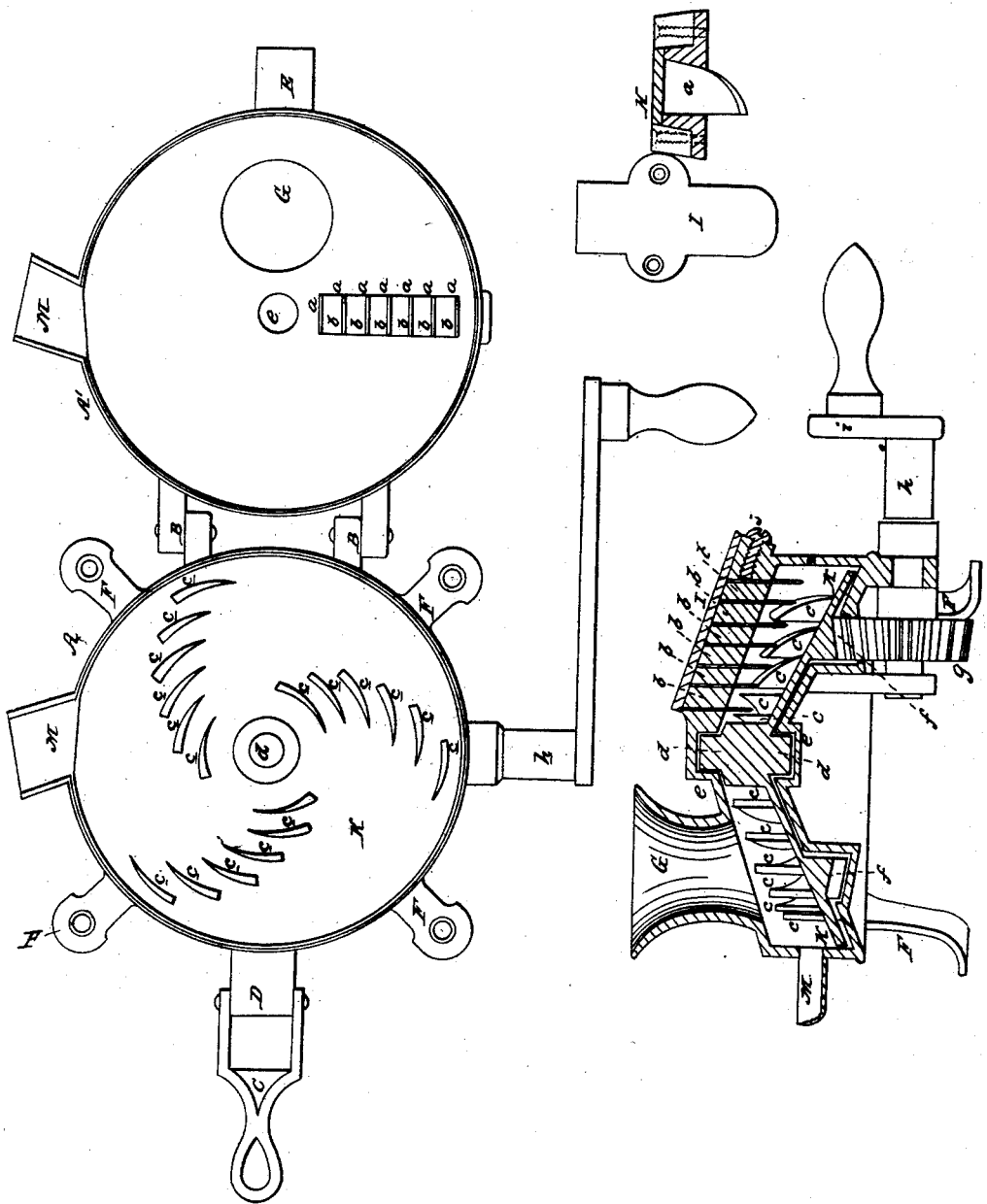
Witnesses:
Inventor:

UNITED STATES PATENT OFFICE.

OLIVER C. WOODRUFF, OF SOUTHINGTON, CONNECTICUT.

IMPROVED MEAT-CUTTER.

Specification forming part of Letters Patent No. 26,806, dated January 10, 1860.

*To all whom it may concern:*

Be it known that I, OLIVER D. WOODRUFF, of Southington, county of Hartford, and State of Connecticut, have invented certain new and useful Improvements in Machines for Cutting Meat, &c.; and I do hereby declare that the same is described and represented in the following specification and drawing, and to enable others skilled in the art to make and use the said improvement I will proceed to describe its construction, and refer to the drawing, in which the same letters indicate like parts.

The nature of this improvement consists, first, of an upper and a lower plate jointed together so as to open and close freely, forming thereby a case in which is arranged the cutting device, and provided with a proper fastening to secure them together when closed, and also with legs or supports, by which it may be secured or sustained in place for use, the upper one being also provided with a funnel or feeder through which the meat is introduced to the action of the machine, having a proper arrangement of operating and cutting device; second, in providing an intermediate revolving plate, having its bearings, one in the upper plate and one in the lower plate. Upon the upper side of said plate is arranged in a proper manner fingers or suitable projections, designed to take, carry, or convey the meat around from the funnel or feeder to the action of the said cutting device, the power or motion being given through the gearing arranged upon the under side of the machine and to the under side of the said plate revolving between the jointed plates, or in the case proper, thus receiving, cutting, and discharging the meat (or other substance for which said machine is capable of cutting) in the most expeditious and perfect manner, said machine being much less expensive, and at the same time more simple and perfect in its operation.

In the accompanying drawing is shown a detail view of the construction and arrangement substantially in the manner which I propose to make my machines for use.

A is the lower plate, and A' is the upper plate, both of which are jointed together at B, and when closed are secured together by the clasp C on the projection D, which turns over onto the end of the projection E, or by other suitable fastenings. F are legs or supports by which it is sustained or secured in place for use, formed on the bottom part of the lower plate A.

G is the funnel or feeder through which the meat is introduced to the action of the machine.

H is the cutting device, which consists of a series of cutters $a$. I propose to arrange one or more of these series of cutters in the plate A', (if at any time it shall be thought desirable; but at present it is believed that one series will be found to be sufficient.) These cutters may be secured in place in any of the well-known ways. I have here shown them fitted in from the upper side of the plate A', having wood or iron blocks $b$ fitted between them with special reference to the fingers $c$, and held in place by the cap I or set-screw J.

K is the intermediate revolving plate. $d$ are its bearings or pivots, upon which it turns and by which it is held in place by their bearings $e$.

$c$ are the fingers or suitable projections properly arranged with reference to the cutters $a$, the office of which is to take, carry, or convey the meat, &c., around from the funnel or feeder G to the action of the cutters $c$, and finally delivering it off from the machine through the discharge-tube M, produced by the employment of the gear or teeth $f$ upon the under side of the revolving plate K in connection with the pinion-gear $g$, shaft $h$, and crank $i$, all being arranged and secured properly and mechanically, substantially as shown in the drawing.

The operation of the machine will be fully understood from the description and drawings, and the advantage to be derived by it over others now in use are: It is cheaper of construction, is more easily kept in order, and is more simple and efficient in its operation.

What I claim, therefore, and desire to secure by Letters Patent, is—

The employment and arrangement of the revolving plate K within the case A A' with reference to the fingers $c$ and cutters $a$, operating substantially in the manner as and for the purpose described.

In witness whereof I have hereunto set my hand and affixed my seal this 21st day of December, 1859.

OLIVER D. WOODRUFF. [L. S.]

Witnesses:
　EDWARD W. BLISS,
　JEREMY W. BLISS.